United States Patent
Sato et al.

(10) Patent No.: US 11,773,306 B2
(45) Date of Patent: Oct. 3, 2023

(54) VINYL CHLORIDE SOL-BASED ULTRAVIOLET CURABLE SEALING MATERIAL

(71) Applicants: PARKER ASAHI Co., Ltd., Tokyo (JP); TOYOTA JIDOSHA KABUSHIKI KAISHA, Aichi-ken (JP)

(72) Inventors: Masahiro Sato, Saitama (JP); Eiichi Ishida, Saitama (JP); Ayumi Watanabe, Aichi-ken (JP)

(73) Assignees: PARKER ASAHI CO., LTD., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 319 days.

(21) Appl. No.: 17/036,161

(22) Filed: Sep. 29, 2020

(65) Prior Publication Data
US 2021/0095173 A1 Apr. 1, 2021

(30) Foreign Application Priority Data
Oct. 1, 2019 (JP) .................................. 2019-181128

(51) Int. Cl.
*C09K 3/10* (2006.01)
*C08L 75/14* (2006.01)
*C08L 27/06* (2006.01)

(52) U.S. Cl.
CPC ............ *C09K 3/1021* (2013.01); *C08L 27/06* (2013.01); *C08L 75/14* (2013.01); *C09K 2200/065* (2013.01); *C09K 2200/0635* (2013.01)

(58) Field of Classification Search
None
See application file for complete search history.

(56) References Cited

U.S. PATENT DOCUMENTS

2020/0048512 A1  2/2020  Sasagase et al.

FOREIGN PATENT DOCUMENTS

| JP | H06-316664 A | | 11/1994 |
|---|---|---|---|
| JP | 08127693 A | * | 5/1996 |
| JP | 2010-059355 | | 3/2010 |
| JP | 2010-059358 | | 3/2010 |
| JP | 2010-084105 A | | 4/2010 |
| JP | 5253935 B2 | * | 7/2013 |
| JP | 2016-098288 A | | 5/2016 |
| JP | 2020-023641 A | | 2/2020 |

OTHER PUBLICATIONS

Office Action issued in Japanese Patent Application No. 2019-181128, dated Oct. 5, 2021.
Office Action issued in DE Patent Application No. 10 2020 212 274.1, dated Mar. 9, 2021, English translation.

* cited by examiner

*Primary Examiner* — Sanza L. McClendon
(74) *Attorney, Agent, or Firm* — GREENBLUM & BERNSTEIN, P.L.C.

(57) ABSTRACT

Provided is a UV curable sealing material containing a vinyl chloride sol as a main ingredient, the film strength of the sealing material being not reduced even in a thin film, the sealing material thus having high resistant pressure against a hem blister. Provided is a vinyl chloride sol composition containing a vinyl chloride-based resin, a UV curable resin having a polar group (functional group), a blocked isocyanate resin, and a filler, the vinyl chloride sol composition being characterized by containing the UV curable resin having a polar group (functional group) in an amount of 20 to 100 parts by weight, the blocked isocyanate resin in an amount of 10 to 50 parts by weight, and the filler in an amount of 50 to 160 parts by weight, relative to 100 parts by weight of the vinyl chloride-based resin.

10 Claims, No Drawings

VINYL CHLORIDE SOL-BASED ULTRAVIOLET CURABLE SEALING MATERIAL

TECHNICAL FIELD

The present invention relates to a vinyl chloride sol composition used as a sealing material. More particularly, the present invention relates to a vinyl chloride sol composition used as a sealing material that is cured by irradiation with an ultraviolet ray and then is cured with heat.

BACKGROUND ART

As a sealing material used in a steel sheet joint of an automobile, a sealing material that can be used without depending on conditions of a line baking process and in which air expansion and the like can be suppressed is desired. In a UV curable sealing material in the related art, the application thickness of the sealing material is to be about 1 to 2 mm for suppressing a hem blister at, for example, a joint of steel sheets. By keeping the thickness, the film strength is to be increased to increase the resistant pressure against a hem blister.

Thus, a UV curable sealing material in which the material can be fixed by curing a UV curable resin through irradiation with an ultraviolet ray has heretofore been proposed (see, for example, Patent Document 1). The technique of Patent Document 1 uses a silica as a filler for increasing the light transmittance of a UV curable sealing material to enable irradiation with an ultraviolet ray into the depth part even in the case of a thickness of 1 to 3 mm.

RELATED ART DOCUMENT

Patent Document

[Patent Document 1] JP-A-2010-84105

SUMMARY OF THE INVENTION

Problems to be Solved by the Invention

When a UV curable sealing material is used in, for example, an automobile, the sealing material is to be averaged thinly for the purpose of maintaining a good appearance. In many processes, the application thickness cannot be kept at 1 to 2 mm but is made as thin as 0.1 to 0.5 mm. In such a thin portion, the film strength of the sealing material decreases and thus the resistant pressure against a hem blister is reduced.

As a result, a hem blister is generated and an additional process for repair is needed, for example. This leads to a problem of reduction in working efficiency.

The present invention has been made in view of the above circumstances, and provides a UV curable sealing material containing a vinyl chloride sol as a main ingredient, the film strength of the sealing material being not reduced even in such a thin film, the sealing material thus having high resistant pressure against a hem blister.

Specifically, an object of the present invention is to provide a UV curable sealing material containing a vinyl chloride sol as a main ingredient, in which a UV curable resin containing a polar group (functional group) in the main backbone thereof is used, thereby increasing the adhesion force between the UV cured sealing material and an electrodeposition coating surface to increase resistant pressure against a hem blister.

Means for Solving the Problem

As a result of intensive and extensive studies for solving the above problem, the present inventors have found that a vinyl chloride sol composition having increased adhesion force to an electrodeposition coating surface and having high resistant pressure against a hem blister can be obtained through a vinyl chloride sol composition containing a vinyl chloride-based resin, a UV curable resin having a polar group (functional group), a blocked isocyanate resin, and a filler.

(1) The vinyl chloride sol composition of the present invention is made based on the above finding, the vinyl chloride sol composition containing a vinyl chloride-based resin, a UV curable resin having a polar group (functional group), a blocked isocyanate resin, and a filler, the vinyl chloride sol composition containing the UV curable resin having a polar group (functional group) in an amount of 20 to 100 parts by weight, the blocked isocyanate resin in an amount of 10 to 50 parts by weight, and the filler in an amount of 50 to 160 parts by weight, relative to 100 parts by weight of the vinyl chloride-based resin.

(2) The vinyl chloride sol composition according to the above (1), characterized by further containing a urethane acrylate-based UV curable resin in an amount of 20 to 100 parts by weight relative to 100 parts by weight of the vinyl chloride-based resin.

(3) The vinyl chloride sol composition according to the above (1) or (2), characterized by containing, as the filler, a silica in an amount of 0 to 100 parts by weight relative to 100 parts by weight of the vinyl chloride-based resin.

(4) The vinyl chloride sol composition according to any one of the above (1) to (3), characterized by containing, as the filler, a hydrophobically surface-treated silica in an amount of 0 to 100 parts by weight relative to 100 parts by weight of the vinyl chloride-based resin.

(5) The vinyl chloride sol composition according to any one of the above (1) to (4), characterized by containing, as the filler, in addition to the silica and/or the hydrophobically surface-treated silica, a surface-treated calcium carbonate in an amount of 0 to 90 parts by weight relative to 100 parts by weight of the vinyl chloride-based resin.

(6) The vinyl chloride sol composition according to any one of the above (1) to (5), characterized by containing a polymerization initiator in an amount of 0.5 to 10 parts by weight relative to 100 parts by weight of the vinyl chloride-based resin.

(7) The vinyl chloride sol composition according to any one of the above (1) to (6), characterized by containing a latent curing agent in an amount of 0 to 5 parts by weight relative to 100 parts by weight of the vinyl chloride-based resin.

(8) The vinyl chloride sol composition according to any one of the above (1) to (7), characterized by containing, as the vinyl chloride-based resin, two or more vinyl chloride-based resins in mixture.

(9) The vinyl chloride sol composition according to any one of the above (1) to (8), characterized by containing, as the blocked isocyanate resin, two or more blocked isocyanate resins in mixture.

(10) The vinyl chloride sol composition according to any one of the above (1) to (9), characterized by further containing a polymer-based plasticizer in an amount of 60 to 210 parts by weight relative to 100 parts by weight of the vinyl chloride-based resin.

(11) The vinyl chloride sol composition according to the above (10), characterized by containing, as the polymer-based plasticizer, two or more polymer-based plasticizers in mixture.

Advantageous Effects of the Invention

In the vinyl chloride sol composition of the present invention, the adhesion force to an electrodeposition coating surface is increased to increase the resistant pressure against a hem blister, and thus the hem blister can be suppressed.

Mode for Carrying Out the Invention

An embodiment of the vinyl chloride sol composition according to the present invention will be described below.

The vinyl chloride sol composition according to the present invention can be used as, for example, a sealing material for a steel sheet joint of an automobile, an undercoat material used in a part of a vehicle, such as a floor back or a wheel house, or an ant-chipping material used in a locker panel, a lower part of a door, or a fender.

The vinyl chloride sol composition according to the present invention, when used as a sealing material, is typically used (applied) in a thickness of about 0.1 to 3 mm.

The sealing composition according to the present invention is vinyl chloride sol composition containing a vinyl chloride-based resin, a UV curable resin having a polar group (functional group), a blocked isocyanate resin, and a filler, the vinyl chloride sol composition containing the UV curable resin having a polar group (functional group) in an amount of 20 to 100 parts by weight, the blocked isocyanate resin in an amount of 10 to 50 parts by weight, and the filler in an amount of 50 to 160 parts by weight, relative to 100 parts by weight of the vinyl chloride-based resin.

The sealing composition may further contain a urethane acrylate-based UV curable resin, and may contain a silica, a hydrophobically surface-treated silica, or a surface-treated calcium carbonate, as the filler. A latent curing agent is preferably contained in an amount of 5 parts by mass or less relative to 100 parts by mass of the vinyl chloride-based resin. Two or more vinyl chloride-based resins may be contained in mixture as the vinyl chloride-based resin. Two or more blocked isocyanate resins may be contained in mixture as the blocked isocyanate resin. One polymer-based plasticizer may be contained or two or more polymer-based plasticizers may be contained in mixture.

As the vinyl chloride-based resin, for example, a vinyl chloride homopolymer, a copolymer of vinyl chloride with a vinyl carboxylate, such as vinyl acetate, vinyl propionate, or vinyl butyrate, or a copolymer of vinyl chloride with an acrylate ester or a methacrylate ester, such as an alkyl acrylate ester or an alkyl methacrylate ester, or a mixture thereof can be used. In the present invention, a copolymer with a vinyl acetate or a copolymer with an alkyl acrylate ester or an alkyl methacrylate ester is preferred, and a copolymer with an alkyl acrylate ester having a polar group, such as a hydroxy group, in the molecule is more preferred.

Two or more vinyl chloride-based resins may be used in mixture, and two or more vinyl chloride-based resins having different compositions are preferably used in combination for enhancing physical properties of the sealing material of the present invention.

As the UV curable resin, a UV curable resin having a polar group (functional group) in the molecule is preferably used. The polar group (functional group) is not particularly limited, and a polar group, such as a hydroxy group or an amino group, is preferably used. A UV curable resin having a hydroxy group in the molecule is more preferably used.

As the UV curable resin, an oligomer that is a reactive urethane oligomer, has a urethane structure obtained by reacting an isocyanate and a polyol, and also has a radical polymerizable carbon-carbon double bond of an acryloyl group or the like at a molecular end can be used.

As the isocyanate, an aliphatic isocyanate or an aromatic isocyanate can be used.

Usable examples of the aliphatic isocyanate include trimethylene diisocyanate, tetramethylene diisocyanate, hexamethylene diisocyanate, pentamethylene diisocyanate, 2,4,4- or 2,2,4-trimethylhexamethylene diisocyanate, and dodecamethylene diisocyanate.

Usable examples of the aromatic isocyanate include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, and an adduct compound, an isocyanurate compound, and a biuret compound thereof.

Besides the above compounds, isophorone diisocyanate, hydrogenated tolylene diisocyanate, hydrogenated diphenylmethane diisocyanate, hydrogenated xylylene diisocyanate, or dimer acid diisocyanate can be used, for example.

As the polyol, a polyether polyol and a polyester polyol can typically be used. Usable examples of the polyether polyol include: a polyether polyol obtained by addition polymerization of one or two or more of monomers, such as ethylene oxide, propylene oxide, butylene oxide, styrene oxide, epichlorohydrin, tetrahydrofuran, and cyclohexylene, by an ordinary method, using as an initiator one or two or more of compounds having at least two active hydrogen atoms, such as ethylene glycol, diethylene glycol, triethylene glycol, propylene glycol, trimethylene glycol, 1,3-butanediol, 1,4-butanediol, 1,6-hexanediol, neopentyl glycol, glycerol, trimethylolethane, trimethylolpropane, sorbitol, sucrose, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid, and 1,2,3-propanetrithiol; and a polyether polyol obtained by ring-opening polymerization of such a monomer as described above using a cationic catalyst, a proton acid, a Lewis acid, or the like as a catalyst.

As the polyester polyol, a condensed polyester polyol, a lactone-based polyester polyol, and a polyester polyol including polycarbonatediol can be used, for example.

Besides the above compounds, a polymer polyol obtained by polymerization or graft polymerization of an acrylonitrile alone or a mixed monomer of an acrylonitrile and at least one selected from the group consisting of styrene, acrylamide, an acrylate ester, a methacrylate ester, and vinyl acetate in a polybutadiene-based polyol, a polyolefin-based polyol, or a polyether polyol can be used, for example.

As the UV curable resin, a UV curable resin having a polar group (functional group), for example, an epoxy-based UV curable resin having a polar group (functional group), is preferably used, which can increase the adhesion force between the sealing material and a base after ultraviolet ray curing. Here, the polar group (functional group) is preferably a functional group that can form a hydrogen bond, such as a hydroxy group or an amino group, and is particularly preferably a hydroxy group.

The UV curable resin having a polar group (functional group) is preferably contained in an amount of 20 to 100 parts by weight, and more preferably 20 to 90 parts by weight, relative to 100 parts by weight of the vinyl chloride-based resin. This is because, with a content less than 20 parts by weight, the adhesion force between the sealing material and an electrodeposition coating surface is insufficient, and with a content more than 100 parts by weight, softness desired in a sealing material cannot be achieved.

In addition, a urethane acrylate-based UV curable resin may be used in combination, and then, further effects of increasing softness and enhancing the adhesion force to an electrodeposition coating surface can be expected. The urethane acrylate-based UV curable resin is preferably contained in an amount of 20 to 100 parts by weight, and more preferably 20 to 90 parts by weight, relative to 100 parts by weight of the vinyl chloride-based resin. With an amount less than 20 parts by weight, a desired softness cannot be achieved, and with an amount more than 100 parts by weight, the adhesion force to an electrodeposition coating surface may decrease.

As the polymerization initiator, for example, a benzoin compound, an alkylphenone compound (benzyldimethylketal, α-hydroxyalkylphenone, α-aminoalkylphenone, or the like), an acylphosphine oxide compound (monoacylphosphine oxide, bis-acylphophine oxide, or the like), a titanocene compound, an oxime ester compound, an oxyphenylacetate ester compound, or a sulfur compound, such as tetramethylthiuram disulfide, can be used, for example.

Among such polymerization initiators, an acylphosphine oxide compound is preferably used because of the need of ultraviolet ray curing into the depth in the case of a thick film. In addition, an α-hydroxyalkylphenone compound which is an alkylphenone compound is preferably mixed with the acylphosphine oxide compound. This is because the polymerization efficiency can be increased and the surface curing can be promoted. As the polymerization initiator, one type for promoting surface curing and another type for promoting curing into depth may be used in combination.

The polymerization initiator is preferably contained in an amount of 0.5 to 10 parts by weight relative to 100 parts by weight of the vinyl chloride-based resin. With a content less than 0.5 parts by weight, the ultraviolet ray curing is insufficient, and with a content more than 10 parts by weight, a large amount of unreacted materials remains to reduce the coating performance.

As the blocked isocyanate resin as an adhesion agent, an amine-based blocked isocyanate-containing urethane prepolymer is preferably used. The amine-based blocked isocyanate-containing urethane prepolymer is obtained by blocking an isocyanate remaining in a polyurethane which is a product of a reaction of an isocyanate and a polyol, such as a polyether polyol or a polyester polyol, using an amine-based blocking agent.

The blocked isocyanate-containing urethane prepolymer can be produced according to the following procedure. First, a polyol and an excess polyisocyanate compound are reacted to obtain a terminal-NCO-containing urethane prepolymer.

As the polyol, a polyether polyol and a polyester polyol can typically be used. Usable examples of the polyether polyol include: a polyether polyol obtained by addition polymerization of one or two or more of monomers, such as ethylene oxide, propylene oxide, butylene oxide, styrene oxide, epichlorohydrin, tetrahydrofuran, and cyclohexylene, by an ordinary method, using as an initiator one or two or more of compounds having at least two active hydrogen atoms, such as ethylene glycol, diethylene glycol, triethylene glycol, propylene glycol, trimethylene glycol, 1,3-butanediol, 1,4-butanediol, 1,6-hexanediol, neopentyl glycol, glycerol, trimethylolethane, trimethylolpropane, sorbitol, sucrose, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid, and 1,2,3-propanetrithiol; and a polyether polyol obtained by ring-opening polymerization of such a monomer as described above using a cationic catalyst, a proton acid, a Lewis acid, or the like as a catalyst.

As the polyester polyol, a condensed polyester polyol, a lactone-based polyester polyol, and a polyester polyol including polycarbonatediol can be used, for example.

Besides the above compounds, a polymer polyol obtained by polymerization or graft polymerization of an acrylonitrile alone or a mixed monomer of an acrylonitrile and at least one selected from the group consisting of styrene, acrylamide, an acrylate ester, a methacrylate ester, and vinyl acetate in a polybutadiene-based polyol, a polyolefin-based polyol, or a polyether polyol can be used, for example.

Usable examples of the polyisocyanate compound include: aliphatic isocyanates, such as trimethylene diisocyanate, tetramethylene diisocyanate, hexamethylene diisocyanate, pentamethylene diisocyanate, 2,4,4- or 2,2,4-trimethylhexamethylene diisocyanate, and dodecamethylene diisocyanate; alicyclic or aromatic isocyanates, such as 1,3-cyclopentane diisocyanate, 1,4-cyclohexane diisocyanate, 1,3-cyclohexane diisocyanate, 4,4'-methylenebis(cyclohexyl isocyanate), methyl-2,4-cyclohexane diisocyanate, methyl-2,6-cyclohexane diisocyanate, 1,4-bis(isocyanatomethyl)cyclohexane, 1,3-bis(isocyanatomethyl)cyclohexane, m-phenylene diisocyanate, p-phenylene diisocyanate, 4,4'-diphenyl diisocyanate, 1,5-naphthalene diisocyanate, 4,4'-diphenylmethane diisocyanate, crude MDI, 2,4- or 2,6-tolylene diisocyanate, 4,4'-toluidine diisocyanate, dianisidine diisocyanate, 4,4'-diphenyl ether diisocyanate, 1,3- or 1,4-xylylene diisocyanate, and ω,ω'-diisocyanato-1,4-diethylbenzene. Besides the above compounds, isophorone diisocyanate, hydrogenated tolylene diisocyanate, hydrogenated diphenylmethane diisocyanate, hydrogenated xylylene diisocyanate, or dimer acid diisocyanate can be used, for example.

Next, the terminal-NCO-containing urethane prepolymer is reacted with an appropriate amine-based blocking agent to block free NCO to thereby obtain a target amine-based blocked isocyanate-containing urethane prepolymer.

As the amine-based blocking agent, for example, an amine compound, such as dicyclohexylamine, can be used.

As the blocked isocyanate resin as an adhesion agent, an oxime-based blocked isocyanate-containing urethane prepolymer, an amine-based blocked isocyanate-containing urethane prepolymer, or the like is also preferably used.

The blocked isocyanate resin is preferably contained in an amount of 10 to 50 parts by weight relative to 100 parts by weight of the vinyl chloride-based resin. With an amount less than 10 parts by weight, the desired adhesion force to an electrodeposition coating surface is not achieved, and with an amount more than 50 parts by weight, the viscosity is increased to deteriorate the application workability. Two or more blocked isocyanate resins having different compositions are preferably used in combination for enhancing physical properties of the sealing material of the present invention.

When a UV curable resin is allowed to stand for a long period of time, oxygen inhibition occurs by oxygen in the air to reduce the crosslinking density. However, when an amine is bonded as a blocking agent, the amine acts as a base to exhibit an effect of suppressing the oxygen inhibition of the UV curable resin. Accordingly, the crosslinking density of the UV curable resin can be kept to maintain physical properties upon ultraviolet ray curing. Furthermore, the high crosslinking density reduces the influence of the exterior moisture.

Examples of the latent curing agent include a polyamine-based compound and a modified compound thereof, an aromatic amine-based compound and a modified compound thereof, and a hydrazide compound. Any compound that is inactive at normal temperature but is activated particularly with heat to react with an isocyanate can be used. The latent curing agent is preferably contained in an amount of 5 parts by mass or less relative to 100 parts by mass of the vinyl chloride-based resin, and particularly preferably, no latent curing agent is contained. This is because physical properties of a cured product are deteriorated with a content more than 5 parts by mass. The latent curing agent is a stable curing agent, but tends to affect the stability and coloring properties when added. Thus, it is desired that the sealing composition according to the invention contain no latent curing agent.

As the filler, a silica is preferably used, and in addition to the silica, for example, an inorganic filler, such as calcium carbonate, barium sulfate, clay, diatom earth, or talk, can be used. As the filler, in addition to the silica, one of the inorganic fillers can be used alone or two or more thereof can be used in combination. A particularly suitable combination is a combination of a silica having high light transmittance and a hydrophobically surface-treated silica and/or a surface-treated calcium carbonate.

As the filler, a silica and a hydrophobically surface-treated silica and/or a surface-treated calcium carbonate are preferably used in mixture. A silica, when is allowed to stand under a high temperature and high humidity atmosphere for a long period of time, undergoes aggregation due to moisture which penetrates the sealing material to reduce physical properties of the sealing material upon ultraviolet ray curing. However, by replacing a part of the silica with a hydrophobically surface-treated silica and a surface-treated calcium carbonate, the aggregation of the silica due to moisture is reduced to mitigate the deterioration in the physical properties of the sealing material due to the moisture absorption after the silica is allowed to stand under a high temperature and high humidity atmosphere for a long period of time.

The silica as the filler is preferably contained in an amount of 0 to 100 parts by weight, and more preferably contained in an amount of 30 to 70 parts by weight relative to 100 parts by weight of the vinyl chloride-based resin. With a content less than 30 parts by weight, the viscosity tends to decrease and the silica is required to be replaced by a hydrophobically surface-treated silica. With a content more than 100 parts by weight, little increase is achieved in the effect.

The hydrophobically surface-treated silica is preferably contained in an amount of 0 to 100 parts by weight, more preferably contained in an amount of 30 to 90 parts by weight relative to 100 parts by weight of the vinyl chloride-based resin. With a content less than 30 parts by weight, a desired softness tends not to be achieved, and with a content more than 100 parts by weight, the adhesion force to an electrodeposition coating surface may be reduced.

The surface-treated calcium carbonate is preferably contained in an amount of 0 to 90 parts by weight relative to 100 parts by weight of the vinyl chloride-based resin. With a content more than 90 parts by weight, the adhesion force to an electrodeposition coating surface is reduced and the ultraviolet ray transmittance decreases to deteriorate the curability.

As the plasticizer, a phthalic acid ester, such as diisononyl phthalate (DINP), octylbenzyl phthalate (OBzP), dioctyl phthalate (DOP), dinonyl phthalate (DNP), or diisodecyl phthalate (DIDP); an adipic acid ester, such as dioctyl adipate (DOA); a trimellitic acid ester, such as trioctyl trimellitate(TOTM); butylphthalyl butylglycolate (BPBG), dioctyl azelate (DOZ), dioctyl sebacate (DOS), an adipic acid-based polyester plasticizer, or a phthalic acid-based polyester plasticizer can be used. A polymer-based plasticizer, such as an adipic acid-based polyester plasticizer or a phthalic acid-based polyester plasticizer, is preferably used. In this case, two or more polymer-based plasticizers having different molecular weights are preferably used in combination for enhancing physical properties of the sealing material of the present invention.

The polymer-based plasticizer is preferably contained in an amount of 60 to 210 parts by weight, and more preferably contained in an amount of 80 to 210 parts by weight relative to 100 parts by weight of the vinyl chloride-based resin. With a content less than 80 parts by weight, a desired softness tends not to be achieved, and with a content more than 210 parts by weight, the adhesion force to an electrodeposition coating surface may be reduced.

In the vinyl chloride sol composition according to the present invention, additives, such as a thixotropy imparting agent, a thermal radical generator, and a hydrocarbon solvent, may be added, as required.

EXAMPLES

The vinyl chloride sol composition according to the present invention will be more specifically described below with reference to examples, but the present invention is not to be limited to the examples as long as the aspect is not beyond the gist of the invention.

The following materials were used to produce vinyl chloride sol compositions of Examples 1 to 29 and Comparative Examples 1 to 5 according to the formulations shown in Tables 1 to 2.

Formulated Materials (1) Vinyl chloride-based resin
A: Copolymer having a polar group in the molecule (MH-100, manufactured by KANEKA CORPORATION)
B: Copolymer with vinyl acetate (PCH-175, manufactured by KANEKA CORPORATION)
(2) Acrylic resin
General purpose acrylic resin (LP-3106, manufactured by MITSUBISHI RAYON CO., LTD.)
(3) UV curable resin
E: UV curable resin having a polar group (functional group) (M-5700, manufactured by TOAGOSEI CO., LTD.)
F: Urethane acrylate-based UV curable resin (CN978, manufactured by Arkema)
(4) Polymerization initiator: bis(2,4,6-trimethylbenzoyl)-phenylphosphine oxide (acylphosphine oxide-based) (IRGACURE 819, manufactured by BASF SE)
(5) Latent curing agent (powder): polyamine-based (EH3731S, manufactured by ADEKA CORPORATION)

(6) Adhesion agent
G: Amine-based blocked isocyanate-containing urethane prepolymer (XMN3030, manufactured by The Dow Chemical Company)
H: Oxime-based blocked isocyanate-containing urethane prepolymer (QR9401-1, manufactured by ADEKA CORPORATION)
(7) Filler: Silica (REOLOSIL, manufactured by Tokuyama Corporation)
Hydrophobically surface-treated silica (RY200S, manufactured by NIPPON AEROSIL Co., Ltd.)
Surface-treated calcium carbonate (NEOLIGHT SP, manufactured by Takehara Kagaku Kogyo Co., Ltd.)
(8) Plasticizer:
General purpose plasticizer: DINP (manufactured by J-PLUS Co., Ltd.)
I: Polymer-based plasticizer:(MESAMOLL, manufactured by LANXESS)
J: Polymer-based plasticizer:(PN-350N, manufactured by ADEKA CORPORATION)

Methods of Testing and Evaluation

For Examples and Comparative Examples, evaluation was performed under the following conditions. The results are shown in Table 1.
(1) Viscosity
The viscosity was measured using a BH viscometer.
Evaluation criteria: a viscosity of 150 to 190 Pa·s was acceptable.
(2) Evaluation of resistant pressure
  a) Evaluation of adhesion force to electrodeposition paint (after ultraviolet ray curing)
The composition of each example was applied on a 70 mm×70 mm steel sheet test piece into a thickness of 0.5 mm and was irradiated with an ultraviolet ray (irradiation condition: 2000 mJ/cm$^2$). Then, the test piece was set in a pressure tester.
The air pressure in the pressure tester was gradually increased, and while keeping a constant pressure for 30 seconds, occurrence of air leakage was checked. The air pressure (kPa) when air leakage occurred was taken as a value of blister resistant pressure.
Evaluation criteria: a resistant pressure of 35 kPa or more was acceptable.
(3) Evaluation of coating suitability
  a) Elongation Percentage
The composition of each example was applied on a release paper into a thickness of 2 mm and was irradiated with an ultraviolet ray (irradiation condition: 1000 mJ/cm$^2$), followed by baking at 140° C. for 25 minutes. Then, the resultant was stamped out with a No. 2 dumbbell, was pulled at a tensile rate of 50 mm/min, and the elongation percentage at break was calculated.
Evaluation criteria: an elongation percentage of 150% or more was acceptable.
  b) Tensile Strength
The composition of each example was applied on a release paper into a thickness of 2 mm and was irradiated with an ultraviolet ray (irradiation condition: 1000 mJ/cm$^2$), followed by baking at 140° C. for 25 minutes. Then, the resultant was stamped out with a No. 2 dumbbell, was pulled at a tensile rate of 50 mm/min, and the maximum strength at break was calculated.
Evaluation criteria: a tensile strength of 0.8 MPa or more was acceptable.
  c) Hardness
The composition of each example was applied on a release paper into a thickness of 2 mm and was irradiated with an ultraviolet ray (irradiation condition: 1000 mJ/cm$^2$), followed by baking at 140° C. for 25 minutes. The sheets were stacked and the hardness at a thickness of 10 mm was calculated with a type A hardness tester.
Evaluation criteria: a hardness of 50 to 90 was acceptable.
  d) Adhesive Property to Electrodeposition Paint
The composition of each example was applied on a 70 mm×150 mm steel sheet test piece with an electrodeposition coating into a thickness of 2 mm, a width of 10 mm, and a length of 100 mm, and was irradiated with an ultraviolet ray (irradiation condition: 1000 mJ/cm$^2$), followed by baking at 130° C. for 12 minutes. Then, the adhesiveness with the electrodeposited steel sheet was checked by scraping off with a fingernail.
Evaluation was performed in terms of which of cohesive failure (Cf), interface failure (adhesive failure (Af)), and cohesive failure with partial interface failure (mixed of Af and Cf) occurred.
Evaluation criteria: interface failure and cohesive failure with interface failure (cases where interface failure occurred even partially) were unacceptable.
  e) Adhesion to Paint
The composition of each example was applied on a 70 mm×150 mm steel sheet test piece with an electrodeposition coating into a thickness of 2 mm, a width of 50 mm, and a length of 100 mm, and was irradiated with an ultraviolet ray (irradiation condition: 1000 mJ/cm$^2$). Then, an intermediate paint, a top-coating paint, and a clear coat were applied, followed by baking at 130° C. for 12 minutes. Subsequently, the resulting test piece was placed in a thermostatic water bath at 40° C. and was kept for 10 days, and then a cross-cut adhesion test was performed.
Evaluation criteria: No peeling off (0/100) was acceptable.
Note that "UVX-T3-405" manufactured by EYE GRAPHICS Co., Ltd. was used in the irradiation with an ultraviolet ray with a distance to the object of 50 mm.
The results of the above evaluations for Examples 1 to 29 and Comparative Examples 1 to 5 are shown in Tables 1 to 2.

TABLE 1

| | Component | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Vinyl chloride-based resin | A: Copolymer having a polar group in the molecule | 50 | 100 | 75 | 25 | — | 50 | 50 | 50 |
| | B: Copolymer with vinyl acetate | 50 | — | 25 | 75 | 100 | 50 | 50 | 50 |
| Acrylic resin | | — | — | — | — | — | — | — | — |
| UV curable resin | E: UV curable resin having a polar group (Functional group) | 53 | 53 | 63 | 53 | 53 | 25 | 80 | 20 |
| | F: Urethane acrylate-based UV curable resin | 53 | 53 | 63 | 53 | 53 | 25 | 26 | 86 |

TABLE 1-continued

| | | | | | | | | | | |
|---|---|---|---|---|---|---|---|---|---|---|
| Polymerization initiator | | | 2 | 2 | 2 | 2 | 2 | 3 | 2 | 2 |
| Latent curing agent | | | — | — | — | — | — | — | — | — |
| Adhesion agent | G: Amine-based blocked isocyanate-containing urethane prepolymer | | 12 | 12 | 12 | 12 | 12 | 12 | 12 | 12 |
| | H: Oximer-based blocked isocyanate-containing urethane prepolymer | | 12 | 12 | 12 | 12 | 12 | 12 | 12 | 12 |
| Filler | Silica | | 36 | 36 | 36 | 36 | 36 | 36 | 36 | 36 |
| | Silica (hydrophobically surface-treated) | | 47 | 47 | 47 | 47 | 47 | 47 | 47 | 47 |
| | Surface-treated calcium carbonate | | 37 | 37 | 37 | 37 | 37 | 37 | 37 | 37 |
| Plasticizer | General purpose | | 44 | 44 | 44 | 44 | 44 | 44 | 44 | 44 |
| | I: Polymer-based | | 112 | 112 | 112 | 1122 | 112 | 112 | 112 | 112 |
| | J: Polymer-based | | 47 | 47 | 47 | 47 | 47 | 47 | 47 | 47 |
| Additive | | | 8 | 8 | 8 | 8 | 8 | 8 | 8 | 8 |
| Viscosity | | BH viscometer 150-190 Pa · s | 170 | 164 | 157 | 174 | 181 | 185 | 153 | 162 |
| Adhesion force to electrodeposition paint (after UV ray curing) | | t 0.5 mm 35 kPa or more | 45 | 45 | 45 | 45 | 45 | 35 | 66 | 35 |
| Elongation percentage 150% or more | | 140° C. × 25 min. | 160% | 150% | 155% | 165% | 165% | 165% | 150% | 165% |
| Tensile strength 0.8 MPa or more | | | 1.8 | 1.8 | 1.8 | 1.7 | 1.7 | 1.7 | 1.9 | 1.7 |
| Hardness 50 to 90 | | | 52 | 52 | 51 | 51 | 50 | 54 | 55 | 51 |
| Adhesive property to electrodeposition paint | | 130° C. × 12 min. Cohesion failure Cf | Cf | Cf | Cf | Cf | Cf | Cf | Cf | Cf |
| Adhesion to paint | | No peeling (0/100) | 0/100 | 1/100 | 0/100 | 0/100 | 0/100 | 0/100 | 0/100 | 0/100 |

| Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|
| 50 | 50 | 50 | 50 | 50 | 50 | 50 | 50 | 50 |
| 50 | 50 | 50 | 50 | 50 | 50 | 50 | 50 | 50 |
| — | — | — | — | — | — | — | — | — |
| 53 | 53 | 53 | 53 | 53 | 53 | 53 | 53 | 53 |
| 53 | 53 | 53 | 53 | 53 | 53 | 53 | 53 | 53 |
| 2 | 2 | 2 | 2 | 2 | 2 | 2 | 2 | 2 |
| — | — | — | — | — | — | — | — | — |
| 10 | 24 | 40 | — | 12 | 12 | 12 | 12 | 12 |
| — | — | — | 24 | 12 | 12 | 12 | 12 | 12 |
| 36 | 36 | 36 | 36 | 30 | 53 | — | 36 | 36 |
| 47 | 47 | 47 | 47 | — | 30 | 83 | 47 | 47 |
| 37 | 37 | 37 | 37 | 37 | 37 | 37 | — | 70 |
| 44 | 44 | 44 | 44 | 44 | 44 | 44 | 44 | 44 |
| 112 | 112 | 112 | 112 | 112 | 112 | 112 | 112 | 112 |
| 47 | 47 | 47 | 47 | 47 | 47 | 47 | 47 | 47 |
| 8 | 8 | 8 | 8 | 8 | 8 | 8 | 8 | 8 |
| 186 | 171 | 162 | 166 | 150 | 179 | 158 | 160 | 180 |
| 45 | 45 | 40 | 40 | 35 | 45 | 45 | 45 | 35 |
| 160% | 155% | 160% | 165% | 180% | 150% | 200% | 165% | 160% |
| 1.8 | 1.9 | 2.0 | 1.7 | 1.3 | 2.3 | 1.7 | 1.7 | 1.9 |
| 53 | 53 | 52 | 50 | 50 | 66 | 52 | 50 | 55 |
| Cf | Cf | Cf | Cf | Cf | Cf | Cf | Cf | Cf |
| 0/100 | 0/100 | 0/100 | 0/100 | 0/100 | 0/100 | 0/100 | 0/100 | 0/100 |

TABLE 2

| | Component | Ex. 18 | Ex. 19 | Ex. 20 | Ex. 21 | Ex. 22 | Ex. 23 |
|---|---|---|---|---|---|---|---|
| Vinyl chloride-based resin | A: Copolymer heving a polar group in the molecule | 50 | 50 | 50 | 50 | 50 | 50 |
| | B: Copolymer with vinyl acetate | 50 | 50 | 50 | 50 | 50 | 50 |
| | Acrylic resin | — | — | — | — | — | — |
| UV curable resin | E: UV curable resin having a polar group (functional group) | 53 | 53 | 53 | 53 | 53 | 53 |
| | F: Urethane acrylate-based UV curable resin | 53 | 53 | 53 | 53 | 53 | 53 |
| | Polymerization initiator | 0.5 | 10 | 2 | 2 | 2 | 2 |
| | Latent curing agent | — | — | 5 | — | — | — |
| Adhesion agent | G: Amine-based blocked isocyanate-containing urethane prepolymer | 12 | 12 | 12 | 12 | 12 | 12 |
| | H: Oxime-based blockad isocyanate-containing urethane prepolymer | 12 | 12 | 12 | 12 | 12 | 12 |
| Filler | Silica | 36 | 36 | 36 | 36 | 36 | 36 |
| | (Silica (hydrophobically surface-treated, | 47 | 47 | 47 | 47 | 47 | 47 |

TABLE 2-continued

| | | | | | | | |
|---|---|---|---|---|---|---|---|
| | Surface-treated calcium carbonate | 37 | 37 | 37 | 37 | 37 | 37 |
| Plasticizer | General purpose | 44 | 44 | 44 | 44 | 113 | — |
| | I. Polymer-based | 112 | 112 | 112 | 144 | 57 | 156 |
| | J: Polymer-based | 47 | 47 | 47 | 15 | 33 | 47 |
| | Additive | 8 | 8 | 8 | 8 | 8 | 8 |
| Viscosity | BH viscometer 150-190 Pa · s | 170 | 171 | 172 | 165 | 150 | 188 |
| Adhesion force to electrodeposition paint (after UV ray curing) | t 0.5 mm 35 kPa or more | 40 | 45 | 45 | 45 | 45 | 45 |
| Elongation percentage 150% or more | 140° C. × 25 min. | 180% | 160% | 150% | 150% | 150% | 180% |
| Tensile strength 0.8 MPa or more | | 1.7 | 7.8 | 2.1 | 1.6 | 1.5 | 2.1 |
| Hardness 50 to 90 | | 50 | 53 | 55 | 51 | 50 | 57 |
| Adhesive property to electrodeposition paint | 130° C. × 12 min. Cohesion failure Cf | Cf | Cf | Cf | Cf | Cf | Cf |
| Adhesion to paint | No peeling (0/100) | 0/100 | 0/100 | 0/100 | 0/100 | 0/100 | 0/100 |

| | Component | Ex. 24 | Ex. 25 | Ex. 20 | Ex. 21 | Ex. 28 | Ex. 20 |
|---|---|---|---|---|---|---|---|
| Vinyl chloride-based resin | A: Copolymer heving a polar group in the molecule | 50 | 50 | 50 | 50 | 50 | 50 |
| | B: Copolymer with vinyl acetate | 50 | 50 | 50 | 50 | 50 | 50 |
| | Acrylic resin | — | — | — | — | — | — |
| UV curable resin | E: UV curable resin having a polar group (functional group) | 53 | 53 | 53 | 53 | 53 | 53 |
| | F: Urethane acrylate-based UV curable resin | 53 | 53 | 53 | 53 | 53 | 53 |
| | Polymerization initiator | 2 | 2 | 2 | 2 | 2 | 2 |
| | Latent curing agent | — | — | 10 | — | — | — |
| Adhesion agent | G:Amine-based blocked isocyanate-containing urethane prepolymer | 12 | 12 | 12 | 12 | 12 | 12 |
| | H: Oxime-based blockad isocya-nate-containing urethane prepolymer | 12 | 12 | 12 | 12 | 12 | 12 |
| Filler | Silica | 36 | 83 | 36 | 36 | 36 | 36 |
| | (Silica (hydrophobically surface-treated, | 47 | — | 47 | 47 | 47 | 47 |
| | Surface-treated calcium carbonate | 37 | 37 | 37 | 37 | 37 | 37 |
| Plasticizer | General purpose | 44 | 44 | 44 | 44 | 136 | 44 |
| | I. Polymer-based | 59 | 112 | 112 | 159 | 47 | — |
| | J: Polymer-based | 100 | 47 | 47 | — | 20 | 159 |
| | Additive | 8 | 8 | 8 | 8 | 8 | 8 |
| Viscosity | BH viscometer 150-190 Pa · s | 190 | 190 | 175 | 159 | 143 | 212 |
| Adhesion force to electrodeposition paint (after UV ray curing) | t 0.5 mm 35 kPa or more | 45 | 45 | 45 | 45 | 45 | 45 |
| Elongation percentage 150% or more | 140° C. × 25 min. | 175% | 100% | 140% | 145% | 130% | 180% |
| Tensile strength 0.8 MPa or more | | 2.0 | 2.5 | 1.8 | 1.6 | 1.4 | 2.1 |
| Hardness 50 to 90 | | 55 | 58 | 57 | 50 | 50 | 56 |
| Adhesive property to electrodeposition paint | 130° C. × 12 min. Cohesion failure Cf | Cf | Cf | Cf | Cf | Cf | Cf |
| Adhesion to paint | No peeling (0/100) | 0/100 | 0/100 | 0/100 | 0/100 | 0/100 | 0/100 |

| | Component | Comp. Ex. 1 | Comp. Ex. 2 | Comp. Ex. 3 | Comp. Ex. 4 | Comp. Ex. 5 |
|---|---|---|---|---|---|---|
| Vinyl chloride-based resin | A: Copolymer heving a polar group in the molecule | — | 50 | 50 | 50 | 50 |
| | B: Copolymer with vinyl acetate | — | 50 | 50 | 50 | 50 |
| | Acrylic resin | 100 | — | — | — | — |
| UV curable resin | E: UV curable resin having a polar group (functional group) | — | 106 | — | 53 | 53 |
| | F: Urethane acrylate-based UV curable resin | 105 | — | 106 | 53 | 53 |
| | Polymerization initiator | 3 | 2 | 2 | 2 | 2 |
| | Latent curing agent | 42 | — | — | — | — |
| Adhesion agent | G:Amine-based blocked isocyanate-containing urethane prepolymer | 32 | 12 | 12 | 5 | 12 |
| | H: Oxime-based blockad isocya-nate-containing urethane prepolymer | 32 | 12 | 12 | — | 12 |
| Filler | Silica | 175 | 36 | 36 | 36 | 36 |
| | (Silica (hydrophobically surface-treated, | — | 47 | 47 | 47 | 47 |
| | Surface-treated calcium carbonate | 87 | 37 | 37 | 37 | 100 |

TABLE 2-continued

| | | | | | | |
|---|---|---|---|---|---|---|
| Plasticizer | General purpose | 112 | 44 | 44 | 44 | 44 |
| | I. Polymer-based | 229 | 112 | 112 | 112 | 112 |
| | J: Polymer-based | — | 47 | 47 | 47 | 47 |
| | Additive | 8 | 8 | 8 | 8 | 8 |
| Viscosity | BH viscometer 150-190 Pa · s | 171 | 144 | 190 | 190 | 190 |
| Adhesion force to electrodeposition paint (after UV ray curing) | t 0.5 mm 35 kPa or more | 25 | 60 | 20 | 50 | 20 |
| Elongation percentage 150% or more | 140° C. × 25 min. | 160% | 100% | 190% | 165% | 130% |
| Tensile strength 0.8 MPa or more | | 1.3 | 1.0 | 1.6 | 1.6 | 2.2 |
| Hardness 50 to 90 | | 49 | 60 | 49 | 52 | 58 |
| Adhesive property to electrodeposition paint | 130° C. × 12 min. Cohesion failure Cf | Cf | Cf | Af | Af | Cf |
| Adhesion to paint | No peeling (0/100) | 1/100 | 0/100 | 17/1001 | 0/100 | 0/100 |

As can be seen in the test results of Examples 1 to 29 and Comparative Examples 1 to 5 shown in Tables 1 to 2, the vinyl chloride sol compositions of Examples show good results in each of the items (1) viscosity, (2) evaluation of resistant pressure, and (3) evaluation of coating suitability. Thus, it was found that a UV curable sealing material that contains a vinyl chloride sol as a main ingredient and that has high resistant pressure against a hem blister can be provided without reduction in the film strength of the sealing material.

The invention claimed is:

1. A vinyl chloride sol composition comprising
   a vinyl chloride-based resin,
   a UV curable resin having a polar functional group,
   a blocked isocyanate resin, and
   a filler comprising
      a non-hydrophobically surface-treated silica and
      a hydrophobically surface-treated silica, the hydrophobically surface-treated silica in an amount of greater than 0 to 100 parts by weight relative to 100 parts by weight of the vinyl chloride-based resin,
   the vinyl chloride sol composition containing
      the UV curable resin having a polar functional group in an amount of 20 to 100 parts by weight,
      the blocked isocyanate resin in an amount of 10 to 50 parts by weight, and
      the filler in an amount of 50 to 160 parts by weight, relative to 100 parts by weight of the vinyl chloride-based resin.

2. The vinyl chloride sol composition according to claim 1, further comprising a urethane acrylate-based UV curable resin in an amount of 20 to 100 parts by weight relative to 100 parts by weight of the vinyl chloride-based resin.

3. The vinyl chloride sol composition according to claim 1, comprising the non-hydrophobically surface-treated silica in an amount of up to 100 parts by weight relative to 100 parts by weight of the vinyl chloride-based resin.

4. The vinyl chloride sol composition according to claim 1, comprising, as the filler, in addition to the non-hydrophobically surface-treated silica and the hydrophobically surface-treated silica, a surface-treated calcium carbonate in an amount of 0 to 90 parts by weight relative to 100 parts by weight of the vinyl chloride-based resin.

5. The vinyl chloride sol composition according to claim 1, comprising a polymerization initiator in an amount of 0.5 to 10 parts by weight relative to 100 parts by weight of the vinyl chloride-based resin.

6. The vinyl chloride sol composition according to claim 1, comprising a latent curing agent in an amount of 0 to 5 parts by weight relative to 100 parts by weight of the vinyl chloride-based resin.

7. The vinyl chloride sol composition according to claim 1, comprising, as the vinyl chloride-based resin, two or more vinyl chloride-based resins in mixture.

8. The vinyl chloride sol composition according to claim 1, comprising, as the blocked isocyanate resin, two or more blocked isocyanate resins in mixture.

9. The vinyl chloride sol composition according to claim 1, further comprising a polymer-based plasticizer in an amount of 60 to 210 parts by weight relative to 100 parts by weight of the vinyl chloride-based resin.

10. The vinyl chloride sol composition according to claim 9, comprising, as the polymer-based plasticizer, two or more polymer-based plasticizers in mixture.

* * * * *